(12) United States Patent
Schwartz et al.

(10) Patent No.: US 8,297,109 B2
(45) Date of Patent: Oct. 30, 2012

(54) METHOD FOR PERFORMING A LEAK TEST ON A TEST OBJECT

(75) Inventors: Vladimir Schwartz, Lexington, MA (US); Boris Chernobrod, Sante Fe, NM (US)

(73) Assignee: Inficon GmbH, Bad Ragaz (CH)

( * ) Notice: Subject to any disclaimer, the term of this patent is extended or adjusted under 35 U.S.C. 154(b) by 279 days.

(21) Appl. No.: 12/757,619

(22) Filed: Apr. 9, 2010

(65) Prior Publication Data

US 2011/0247399 A1 Oct. 13, 2011

(51) Int. Cl.
*G01M 3/20* (2006.01)
(52) U.S. Cl. ......................................... 73/40.7
(58) Field of Classification Search .................... 73/40.7
See application file for complete search history.

(56) References Cited

U.S. PATENT DOCUMENTS

| | | | | |
|---|---|---|---|---|
| 4,413,503 A | * | 11/1983 | Olivieri | 73/40.7 |
| 6,247,995 B1 | * | 6/2001 | Bryan | 446/473 |
| 2011/0284648 A1 | * | 11/2011 | Gharib et al. | 239/1 |

* cited by examiner

*Primary Examiner* — John Fitzgerald
(74) *Attorney, Agent, or Firm* — Renner, Otto, Boisselle & Sklar, LLP

(57) ABSTRACT

For leak testing, a tracer gas is advanced to the outer wall (11) of the hollow test object (10) while the test object (10) is in an evacuated state. The tracer gas is discharged from a blower device (14) in the form of soap bubbles (21). When contacting the outer wall (11), the soap bubbles will burst, thus forming a cloud (27) of tracer gas immediately on the outer wall (11). By the invention, it is made easier to localize the invisible tracer gas in the ambient air. Further, the tracer gas can be used more effectively so that the costs for performing the testing process are reduced.

9 Claims, 1 Drawing Sheet

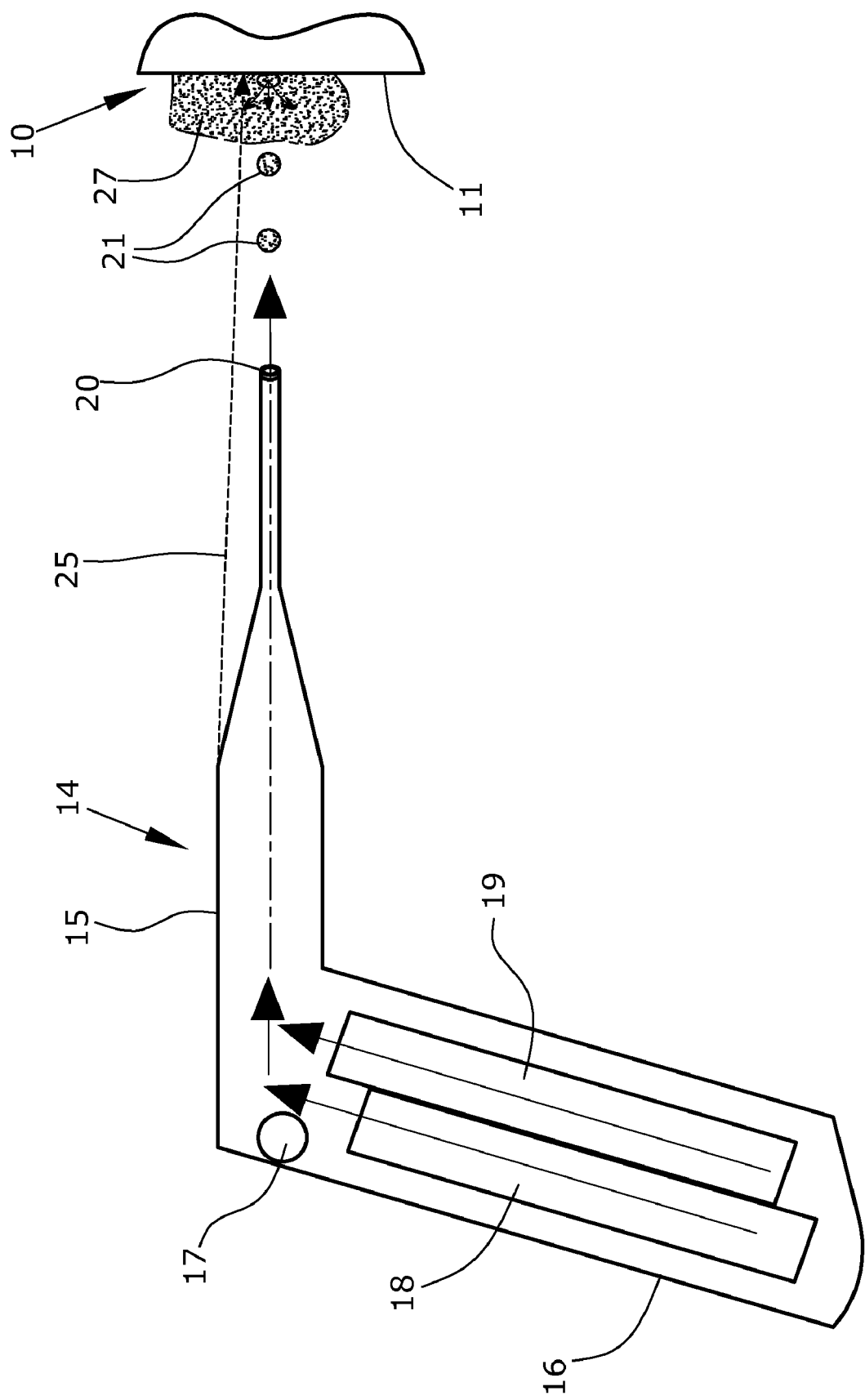

METHOD FOR PERFORMING A LEAK TEST ON A TEST OBJECT

FIELD OF THE INVENTION

The present invention relates to a method for performing a leak test on a test object, said test being of the type wherein a cloud of a tracer gas is generated on an outer wall of the test object and the gas volume in the interior of the test object is tested for the presence of the tracer gas.

DESCRIPTION OF THE PRIOR ART

In the leak testing of containers, tubes and technical plants, it is known to generate, externally of the test object, an atmosphere containing tracer gas in concentrated form. Internally of the test object, a vacuum is generated so that, in case that the test object has a leak, tracer gas will be sucked into the interior of the test object. Normally, helium is used as a tracer gas, which is present in small quantities in the atmosphere and is harmless as a breathing gas. The helium will be sprayed into the ambience of the test object, thus forming an invisible helium cloud which is hovering in the air and drifting along with the flow of the air. Therefore, it is not easy to guide the helium cloud in a controlled manner to the suspected leak sites on the test object so that the helium may enter the test object. To make it possible to differentiate between several leaks situated closely adjacent to each other, it is required that as little helium as possible is allowed to diffuse into the ambience while, on the other hand, the largest possible concentration of helium has to accumulate at the suspicious site.

It is an object of the invention to provide a method for performing a leak test on a test object, which method shall require only a small quantity of tracer gas and be practicable with high effectiveness.

SUMMARY OF THE INVENTION

The method according to the invention is defined by claim 1. In the method of the invention, it is provided that the tracer gas is transported to the test object while contained within soap bubbles. Such soap bubbles will be easily visible to the operator, allowing him or her to see where exactly the tracer gas, preferably helium, is located. This makes it possible to control the flow of soap bubbles and to move it toward the test object by blowing an air-stream onto it, e.g. with the aid of a blower. When contacting the test object, the soap bubbles will burst so that the tracer gas will be released and enter the atmosphere. In this manner, it is made sure that the tracer gas will be brought into the closest vicinity of the wall of the test object and be released there in high concentration. As a result, the consumption of tracer gas is reduced and the leak testing process is accelerated.

The term "soap bubbles" as used herein is to be understood as generally referring to bubbles containing the tracer gas within a soap-like envelope, e.g. within bubbles consisting of a soap-like polymer which has a high surface tension and will burst upon contact with solid bodies. Soap bubbles can be generated by blowing onto a thin soap film which is held within a ring. This can be performed by a manual process involving the application of an air flow exhaled by the operator, or with the aid of a blower.

Preferably, the soap bubbles are generated with a diameter of less than 5 mm. The diameters are preferably less than 2 mm and more preferably are ranged within an order of magnitude of 1 mm. Such small soap bubbles are relatively stable and thus will not burst prematurely. The method can be practiced by use of a manually guided, gun-like blower device wherein the user can choose between the generating of soap bubbles and the mere blowing function as such. If the blower device has been set to soap bubble generation, soap bubbles will be discharged from the device. If the blowing function has been set, only the blower unit as such will be operative so as to drive already existing soap bubbles towards the intended target area.

The invention further relates to a blower device for performing the method of the invention, said blower device being adapted to generate helium-containing soap bubbles exclusively of a diameter less than 5 mm. The blower device includes a tank for storage of a soap-like polymer, a bubble-generating means and blowing source. The device is preferably of the hand-guided type, wherein the operator can switch between a bubble-generating function and a blow-only function. The blower device can be provided with a light source operative to emit a light beam in the blow discharge direction for illuminating and respectively marking the target area.

A full and enabling disclosure of the present invention, including the best mode thereof, enabling one of ordinary skill in the art to carry out the invention, is set forth in greater detail in the following description, including reference to the accompanying drawing.

BRIEF DESCRIPTION OF THE DRAWING

The sole FIG. 1 of the drawing is a representation of the method of the invention in connection with a corresponding blower device shown in schematic outline.

DESCRIPTION OF A PREFERRED EMBODIMENT

According to FIG. 1, a tracer gas, preferably helium, is to be supplied in concentrated form to the outer wall 11 of a hollow test object 10. The test object 10 will be evacuated. In case that a leak exists in said outer wall 11, tracer gas will pass through this leak and thus ingress into the interior of the test object.

For advancing the tracer gas toward the test object, a blower device 14 is provided which is of a gun-like configuration and comprises a barrel 15 and a grip 16 projecting therefrom at an angle. Blower device 14 includes a blowing source 17 which can be a pressurized-air cartridge or a blower, as well as a liquid tank 18 for liquid polymer and a gas tank 19 for the tracer gas. The soap-like, liquid polymer and the tracer gas will be merged within a bubble-generating means 20 to form soap bubbles 21. Said blowing source 17 is operative to drive the soap bubbles 21 out of the blower device.

Blower device 14 is further provided with a light source for emitting a light beam 25 in the blow-out direction and thus illuminating a target area. In this manner, use of the blower devices is rendered more convenient.

Under the effect of the air flow, the soap bubbles 21 containing helium as a tracer gas will be driven against wall 11 and, when impinging thereon, will burst, thus generating a helium cloud 27 on outer wall 11.

The blower device can optionally be designed for several operating modes, i.e. a first operating mode for discharge of soap bubbles filled with tracer gas, and a second operating mode for discharge of non-enclosed tracer gas.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A method for performing a leak test on a test object, said test being of the type wherein a cloud of a tracer gas is generated on an outer wall of the test object and a vacuum is generated in the interior of the test object, the removed gas volume being tested for the presence of the tracer gas, wherein the tracer gas is moved toward the test object while being enclosed within soap bubbles, said soap bubbles bursting upon contact with the test object for advancing the tracer gas in concentrated form to the outer wall of the test object.

2. The method according to claim 1, wherein the soap bubbles are blown out from a blower device.

3. The method according to claim 1, wherein use is made of a manually guided gun-like blower device.

4. The method according to claim 3, wherein the blower device is provided with a light source operative to emit a light beam in the blow-out direction for illuminating a target area.

5. The method according to claim 1, wherein soap bubbles exclusively with a diameter of less than 5 mm are generated.

6. The method according to claim 5, wherein all of the diameters of the soap bubbles are smaller than 2 mm.

7. A blower device for performing a leak test on a test object, said test being of the type wherein a cloud of a tracer gas is generated on an outer wall of the test object and a vacuum is generated in the interior of the test object, the removed gas volume being tested for the presence of the tracer gas, wherein said blower device comprises a tank for a liquid, soap-like polymer, a tank for a tracer gas, a bubble generator for generating bubbles of said soap-like polymer in which said tracer gas is enclosed, and a blowing source operative to generate an air flow containing said tracer gas enclosed within said bubbles of said soap-like polymer, so that said bubbles burst upon contact with the test object for advancing the tracer gas in concentrated form to the outer wall of the test object.

8. The blower device according to claim 7, wherein said blower device is adapted to generate helium-containing soap bubbles exclusively of a diameter of less than 5 mm.

9. The blower device according to claim 7, wherein a switching means is provided for setting a first operating mode for discharge of soap bubbles filled with tracer gas, and a second operating mode for discharge of non-enclosed tracer gas.

* * * * *